(12) United States Patent
Arimilli et al.

(10) Patent No.: US 6,658,538 B2
(45) Date of Patent: Dec. 2, 2003

(54) NON-UNIFORM MEMORY ACCESS (NUMA) DATA PROCESSING SYSTEM HAVING A PAGE TABLE INCLUDING NODE-SPECIFIC DATA STORAGE AND COHERENCY CONTROL

(75) Inventors: Ravi Kumar Arimilli, Austin, TX (US); John Steven Dodson, Pflugerville, TX (US); James Stephen Fields, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 09/885,997

(22) Filed: Jun. 21, 2001

(65) Prior Publication Data

US 2003/0009640 A1 Jan. 9, 2003

(51) Int. Cl.$^7$ ................................................ G06F 12/00
(52) U.S. Cl. ....................................... 711/141; 711/207
(58) Field of Search ..................... 711/205–207, 138, 711/141–145

(56) References Cited

U.S. PATENT DOCUMENTS

| | | | |
|---|---|---|---|
| 5,247,639 A | * 9/1993 | Yamahata | 711/138 |
| 5,353,428 A | * 10/1994 | Shibata | 711/145 |
| 5,680,576 A | * 10/1997 | Laudon | 711/145 |
| 5,787,476 A | * 7/1998 | Laudon et al. | 711/141 |
| 6,286,090 B1 | * 9/2001 | Steely et al. | 711/207 |
| 6,332,169 B1 | * 12/2001 | Hagersten | 710/5 |
| 6,449,700 B2 | * 9/2002 | Hagersten et al. | 711/152 |

\* cited by examiner

*Primary Examiner*—Donald Sparks
*Assistant Examiner*—Paul A Baker
(74) *Attorney, Agent, or Firm*—Casimer K. Salys; Bracewell & Patterson, L.L.P.

(57) ABSTRACT

A non-uniform memory access (NUMA) data processing system includes a plurality of nodes coupled to a node interconnect. The plurality of nodes contain a plurality of processing units and at least one system memory having a table (e.g., a page table) resident therein. The table includes at least one entry for translating a group of non-physical addresses to physical addresses that individually specifies control information pertaining to the group of non-physical addresses for each of the plurality of nodes. The control information may include one or more data storage control fields, which may include a plurality of write through indicators that are each associated with a respective one of the plurality of nodes. When a write through indicator is set, processing units in the associated node write modified data back to system memory in a home node rather than caching the data. The control information may further include a data storage control field comprising a plurality of non-cacheable indicators that are each associated with a respective one of the plurality of nodes. When a non-cacheable indicator is set, processing units in the associated node are instructed to not cache data associated with non-physical addresses within the group translated by reference to the table entry. The control information may also include coherency control information that individually indicates for each node whether or not inter-node coherency for data associated with the table entry will be maintained with software support.

14 Claims, 4 Drawing Sheets

NON-UNIFORM MEMORY ACCESS (NUMA) DATA PROCESSING SYSTEM HAVING A PAGE TABLE INCLUDING NODE-SPECIFIC DATA STORAGE AND COHERENCY CONTROL

BACKGROUND OF THE INVENTION

1. Technical Field

The present invention relates in general to data processing and, in particular, to a non-uniform memory access (NUMA) data processing system. Still more particularly, the present invention relates to a NUMA data processing system having a page table containing node-specific information.

2. Description of the Related Art

The memory subsystem of a typical computer system includes one or more nonvolatile mass storage devices, such as magnetic or optical disks, and a volatile random access memory (RAM), which can include both high speed cache memories and slower system memory. In order to provide enough addresses for memory-mapped I/O as well as the data and instructions utilized by operating system and application software, the processor(s) of the computer system typically utilize a virtual address space including a much larger number of addresses than the number of storage locations that physically exist in RAM. Therefore, to perform memory-mapped I/O or to access RAM, the computer system must translate the virtual addresses utilized by software and the processor hardware into physical addresses assigned to particular I/O devices or physical locations within RAM.

In a typical computer system, at least a portion of the virtual address space is partitioned into a number of memory pages, which each have at least one associated operating system-created address descriptor called a Page Table Entry (PTE). A PTE corresponding to a virtual memory page typically contains the virtual address of the memory page, the associated physical address of the page frame in main memory, and statistical fields indicating if the memory page has been referenced or modified, for example. By reference to a PTE, a processor is able to translate a virtual address within a memory page into a real address. PTEs are stored in RAM in groups called page tables. And because accessing PTEs in RAM to perform each address translation would greatly diminish system performance, each processor in a conventional computer system is also typically equipped with a Translation Lookaside Buffer (TLB) that caches the PTEs most recently accessed by that processor for quick access.

Although the use of PTEs to perform virtual to real address translation is common to most computer systems, the manner in which address translation is accomplished and the way in which PTEs are grouped into page tables varies between computer systems. In general, address translation schemes can be classified as either hierarchical or direct. An exemplary hierarchical translation scheme employed by the x86 and Pentium™ processors manufactured by Intel Corporation is performed as follows. First, a linear (non-physical) address (which for the sake of discussion is assumed to be 32 bits) is partitioned into a 10-bit directory field, a 10-bit table field, and a 12-bit offset field. The value of the directory field of the linear address is utilized as an offset that, when added to a root address stored in a control register, accesses an entry in a page directory. The accessed page directory entry contains a pointer that identifies the base address of a page table. The value of the table field of the linear address forms an offset pointer that, when added to the value of directory entry, selects a page table entry that specifies the base address of a page frame in memory. The value of offset field then specifies a particular physical address within the page frame. Because loading information from the page directory and page table requires high latency memory accesses, the 20 high order bits of the linear address are also utilized in parallel with the above-described translation process to search for a matching page table entry in the TLB. If a match is found in the TLB, the matching page table entry is utilized to perform linear-to-real address translation in lieu of the page directory and page table.

In computer systems that utilize hierarchical address translation schemes such as that described above, each process has its own respective page table, meaning that all PTEs associated with memory pages referenced by a particular process are grouped in the same page table. And because read-only data can be accessed by multiple processes simultaneously, the page tables of multiple processes may concurrently use PTEs associated with the same page of read-only data.

In contrast to hierarchical translation schemes, direct translation schemes do not require multiple levels of directories and tables to be accessed in order to locate the PTE required in perform virtual-to-real address translation. Instead, in direct translation schemes, the virtual address is hashed (and possibly concatenated with operating system-specified bits) in order to determine possible physical addresses of the required PTE in the page table. The page table, which in both uniprocessor and multiprocessor computer systems is typically a global page table that stores all PTEs, can then be searched to locate the required PTE. Of course, a search of the page table in RAM is required only if the PTE identified by the virtual address to be translated is not resident in the processor's TLB.

Recently, there has been increased interest in developing multiprocessor computer systems that overcome the scalability and other limitations of conventional symmetric multiprocessor (SMP) computer systems. One emerging architecture that addresses such shortcomings is the non-uniform memory access (NUMA) architecture, which is defined as a multiprocessor architecture having a system memory to which at least two of the processors in the system have different access times. As a result of the non-uniformity of memory access times, the dynamic location of data vis-á-vis the processes that reference such data is a determining factor of the performance of a NUMA data processing system. Thus, it is desirable for data to be as "close" as possible to the processor executing a process referencing such data in order to achieve minimal access times and hence optimal performance.

Large multiprocessor computer systems, and especially NUMA systems, are frequently utilized to run large applications in which one or more processors function as "producers" of data and one or more other processors function as "consumers" of data. The producer processors process and store (modify) large amounts of data in a set of memory pages. After a producer stores a particular datum, the producer typically never accesses that same datum again. Consumer processors conversely load (read) large amounts of operand data, but typically do not modify (store to) the same data. In view of this common software construct, the present invention recognizes that performance would be enhanced by forcing NUMA nodes containing producers to push modified data down to lower levels of the memory hierarchy since the data will not be accessed again by the producers. Likewise, the present invention recognizes that it would be advantageous to prevent NUMA nodes containing consumers from caching data since the consumers are unlikely to modify the data.

SUMMARY OF THE INVENTION

To provide the above-described and additional advantages, the present invention provides a non-uniform memory access (NUMA) data processing system having a page table including node-specific control bits.

A non-uniform memory access (NUMA) data processing system in accordance with the present invention includes a plurality of nodes coupled to a node interconnect.

The plurality of nodes contain a plurality of processing units and at least one system memory having a table (e.g., a page table) resident therein. The table includes at least one entry for translating a group of non-physical addresses to physical addresses that individually specifies control information pertaining to the group of non-physical addresses for each of the plurality of nodes. The control information may include one or more data storage control fields, which may include a plurality of write through indicators that are each associated with a respective one of the plurality of nodes. When a write through indicator is set, processing units in the associated node write modified data back to system memory in a home node rather than caching the data. The control information may further include a data storage control field comprising a plurality of non-cacheable indicators that are each associated with a respective one of the plurality of nodes. When a non-cacheable indicator is set, processing units in the associated node are instructed to not cache data associated with non-physical addresses within the group translated by reference to the table entry. The control information may also include coherency control information that individually indicates for each node whether or not inter-node coherency for data associated with the table entry will be maintained with software support.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
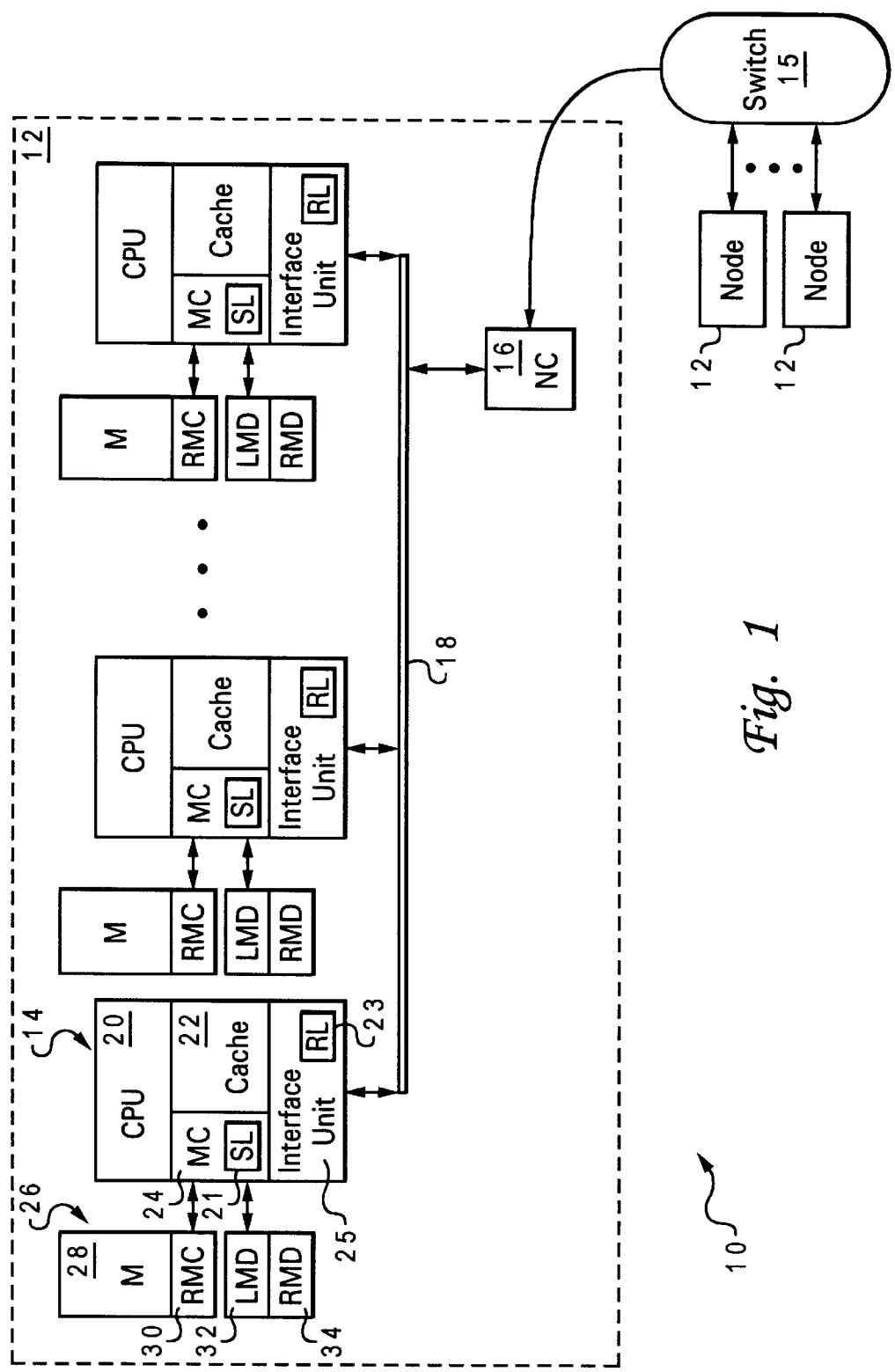
FIG. 1 depicts an illustrative embodiment of a NUMA data processing system with which the method and system of the present invention may advantageously be utilized.

With reference now to the figures and in particular with reference to FIG. 1, there is depicted an exemplary embodiment of a NUMA computer system 10 in accordance with the present invention. The depicted embodiment can be realized, for example, as a workstation, server, or mainframe computer.

As illustrated, NUMA computer system 10 includes two or more nodes 12 coupled by a node interconnect 15, which, as shown, may be implemented as a switch. Although not required by the present invention, in the illustrated embodiment each of nodes 12 is substantially identical, with each node including one or more processing units 14 coupled to a local interconnect 18 and a node controller 16 coupled between local interconnect 18 and node interconnect 15. Each node controller 16 serves as a local agent for other nodes 12 by transmitting selected operations received on its local interconnect 18 to other nodes 12 via node interconnect 15 and by transmitting selected operations received via node interconnect 15 on its local interconnect 18.

As described in more detail below, processing units 14 include a CPU 20 having registers, instruction flow logic and execution units utilized to execute software instructions. Each processing unit 14 further includes a cache hierarchy 22 including one or more levels of on-chip cache utilized to stage data to the associated CPU 20 from data storage throughout NUMA computer system 10. In addition, processing units 14 each have an interface unit 25 that handles the communication of addresses, data and coherency operations between processing unit 14 and local interconnect 18 and includes response logic 23 that determines a combined response to an operation issued on local interconnect 18 from the various snoop responses to the operation. Finally, processing units 14 each contain a memory controller 24 that controls access to an associated one of the physical system memories 26 distributed among processing units 14. In alternative embodiments of the present invention, system memory, if any, in each node may be implemented as a single system memory controlled by an associated memory controller coupled to local interconnect 18.

In the present specification, "system memory" is defined as a physical data storage device addressed utilizing unique addresses that (absent an error condition) are permanently associated with respective storage locations in the physical data storage device. The node 12 that stores a datum at a storage location in its system memory 26 associated with an address utilized to uniquely identify the datum throughout NUMA computer system 10 is defined to be the home node for that datum; conversely, others of nodes 12 are defined to be remote nodes with respect to the datum.

As depicted in FIG. 1, to support data sharing between nodes 12, memory controllers 14 employ a local memory directory (LMD) 32 and a remote memory cache (RMC) 30 having an associated remote memory directory (RMD) 34. As utilized herein, a local memory directory (LMD) is defined as a directory that, for data resident in an associated system memory, stores an indication regarding whether the data are cached in one or more remote nodes. Conversely, a remote memory directory (RMD) is defined as a directory that indicates which data from system memory in other node(s) are cached in the associated remote memory cache (RMC).

Of course, NUMA computer system 10 can further include additional devices that are not necessary for an understanding of the present invention and are accordingly omitted in order to avoid obscuring the present invention. For example, any of nodes 12 may also support I/O and network adapters, non-volatile storage for storing an operating system and application software, and serial and parallel ports for connection to networks or attached devices.

Memory Organization

Performance of NUMA computer system 10 is influenced, among other things, by data access latencies. Because the access latency for intra-node data requests is typically much less than that for inter-node data requests, system performance is generally improved if each node 12 containing a processing unit 14 is equipped with a large data storage capacity, thus minimizing inter-node data requests. For example, in an exemplary embodiment in which NUMA computer system 10 includes four nodes that each contain four processing units 14 and four system memories 26, each of the four system memories 26 may have a capacity of a gigabyte (GB) or more, giving a total system memory storage capacity of multiple gigabytes. Because of the large capacity of system memory, cost considerations would generally dictate the implementation of system memories 26 in a storage technology having low per-byte cost, such as dynamic random access memory (DRAM).

In accordance with the present invention, the storage capacity of system memories 26 maybe partitioned (e.g., by the operating system of NUMA computer system 10) into one or more address spaces. In the embodiment shown in FIG. 1, each system memory 26 includes a system memory address space 28 that is allocated by the operating system of NUMA computer system 10 to various operating system and application processes for storage of instructions and data. In addition, at least one system memory 26 in each node 12 having a processor unit 14 contains a RMC 30 for storing data corresponding to that residing in the system memories 26 of one or more other nodes 12. Thus, a remote memory cache for each node 12 is incorporated within one and possibly multiple system memories 26. In embodiments in which RMC 30 is distributed among multiple system memories 26, the cache lines, which are accessible to at least any CPU 20 in the same node 12, are preferably mapped to particular RMCs 30 by hashing the physical or logical addresses associated with the cache lines.

Because the remote memory cache is implemented in low cost DRAM, the per-byte cost of RMC 30 is dramatically reduced as compared with SRAM implementations, meaning that its size can be greatly increased with little or no additional cost. In addition, by distributing the remote memory cache among multiple system memories in the same node, significant bandwidth improvement is achieved by distributing access control across multiple memory controllers 24 rather than a single node controller.

It should be noted that in some embodiments of the present invention, the operating system may choose to allocate some or all of the physical system memory in one or more nodes to the remote memory cache and none of physical system memory to system memory address space. In such embodiments, the system memory address space may be localized in one or more nodes implemented, for example, as disk memory drawers in a rack system, while the physical system memory in other nodes containing processing units is allocated as remote memory cache.

As noted above, each memory controller 24 associated with a system memory 26 allocated to hold at least a portion of RMC 30 is provided with a RMD 34 in which the memory controller 24 records the contents of its associated portion of RMC 30. As with conventional cache directories, RMD 34 preferably stores not only address information related to the data in RMC 30, but also coherency information, replacement information, and optionally additional state information (e.g., inclusivity).

To support rapid access by memory controller 24 to RMD 34, RMD 34 may be implemented in high speed SRAM as depicted in FIG. 1. This implementation advantageously reduces access latency by promoting rapid directory lookups in response to requests. However, as with RMC 30, use of SRAM for RMD 34 is expensive and limits the size of RMD 34 (and hence RMC 30) for practical systems. Two different approaches may be employed to address such concerns.

First, if RMD 34 is implemented in SRAM (or other high cost storage technology), RMD 34 can implement large sectors (i.e., associate large data blocks with each set of tag and state information) so that use of the SRAM storage capacity is optimized. A second approach is to incorporate RMD 34 into system memory 26 together with RMC 30. In this manner, the cost of implementing RMD 34 can be greatly reduced, or the size of RMD 34 and RMC 30 can be greatly increased without additional cost. Although the incorporation of RMD 34 within the DRAMs of system memory 26 can lead to slower directory access times, this additional directory access latency can be mitigated by equipping memory controller 24 with a small directory cache containing recently accessed (and therefore likely to be accessed) directory entries.

The amount of system memory 26 allocated to RMD 34 and/or RMC 30 by the operating system of NUMA computer system 10 is an important performance consideration since allocating larger RMCs 30 and RMDs 34 necessarily reduces system memory address space 28. In a preferred embodiment, the proportion of system memory 26 allocated to RMC 30 and RMD 34 versus system memory address space 28 can be varied dynamically depending on the needs of the application to be run. For example, if the operating system detects that an application will only need to access the memory within the node 12 in which the application is to be run, the operating system can allocate RMC 30 (and its associated RMD 34) a fairly small space compared with system memory address space 28. Conversely, if the operating system detects that an application will require substantial access to remote memory, the operating system may allocate a larger portion of the system memory to RMC 30 (and its associated RMD 34).

RMCs 30 (and RMDs 34) can be populated according to at least two alternative methods. First, RMCs 30 can be implemented as inclusive (or pseudo-inclusive) caches that collectively store a superset of the data from other nodes held in the local cache hierarchies 22. In this embodiment, cache lines are loaded into the RMCs 30 of a node 12 when requested cache lines are received from other nodes 12. Alternatively, RMCs can be implemented as "victim caches" that only hold cache lines of remote data in a shared or modified coherency state that have been deallocated from local cache hierarchies 22.

Memory Coherency

Because data stored within each system memory 26 can generally be requested, accessed, and modified by any CPU 20 within NUMA computer system 10, NUMA computer system 10 implements one or more compatible cache coherency protocols to maintain coherency (i.e., a coherent view of the aggregate contents of system memory address space 28) between cache hierarchies 22 and RMC 30 in nodes 12. Thus, NUMA computer system 10 is properly classified as a CC-NUMA computer system. The cache coherence protocol is implementation-dependent and may comprise, for example, the well-known Modified, Exclusive, Shared, Invalid (MESI protocol or a variant thereof. As will be understood by those skilled in the art, the coherency protocol(s) utilized by cache hierarchies 22 necessitate the transmission of various implementation-dependent messages across local interconnect 18 and node interconnect 15 to inform cache hierarchies 22 of operations performed by CPUs 20, to obtain needed data and instructions, to writeback modified data to system memories 26, and to perform other functions needed to maintain coherency.

To maintain coherency between nodes, memory controllers 24 store indications within LMD 32 of the system memory addresses of data (i.e., cache lines) checked out to remote nodes 12 from the associated system memory address space 18. In low-end implementations in which maintaining a compact directory is important, LMD 32 may have associated with each data granule only an imprecise indication of whether the data granule is "checked out" to at least one remote node 12. Alternatively, in high-end implementations, LMD 32 preferably stores, in association with each data granule, an indication of the coherency state of the cache line at each remote node 12. Per-node coherency states contained in entries of LMD 32 according to an exemplary embodiment of the present invention include those summarized in Table I.

TABLE I

| Coherence directory state | Possible state(s) in local cache | Possible state(s) in remote cache | Meaning |
| --- | --- | --- | --- |
| Modified (M) | I | M, E, or I | Cache line may be modified at a remote node with respect to system memory at home node |
| Shared (S) | S or I | S or I | Cache line may be held non-exclusively at remote node |
| Invalid (I) | M, E, S, or I | I | Cache line is not held by any remote node |

As indicated in Table I, even in high-end implementations, the knowledge of the coherency states of cache lines held by remote processing nodes can be specified with some degree of imprecision. The degree of imprecision depends upon whether the implementation of the coherency protocol permits a cache line held remotely to make a transition from S to I, from E to I, or from E to M without notifying the LMD 32 at the home node.

Processing Unit Architecture

Figure 2:
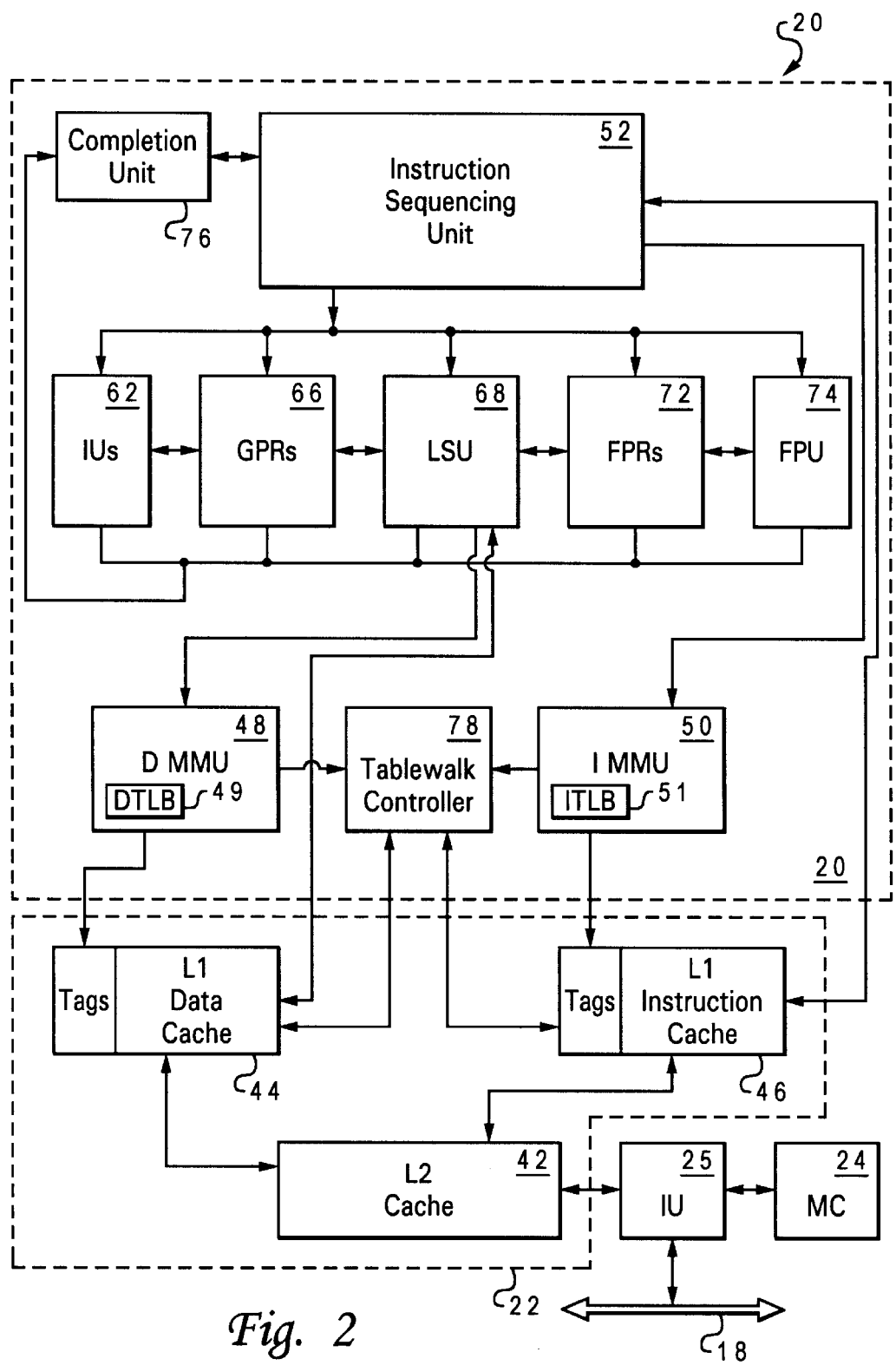
FIG. 2 is a more detailed block diagram of an illustrative embodiment of a processing unit in the NUMA data processing system illustrated in FIG. 1.

Referring now to FIG. 2, a more detailed block diagram of an illustrative embodiment of a processing unit 14 in NUMA computer system 10 is depicted. In the depicted embodiment, processing unit 14 comprises a single integrated circuit including various execution units, registers, buffers, memories, and other functional units, which are all formed by integrated circuitry.

As illustrated in FIG. 2 (and also in FIG. 1), processing unit 20 includes a CPU 20, a cache hierarchy 22, a memory controller 24 and an interface unit (IU) 25, which couples processing unit 20 to local interconnect 18. IU 25 is further connected to cache hierarchy 22, which in the illustrated embodiment includes a unified level two (L2) cache 42 and separate level one (L1) data and instruction caches 44 and 46. Data and instructions stored within the L1 data cache 44 and L1 instruction cache 46, respectively, are identified and accessed by address tags, which each comprise a selected number of high-order bits of the physical address of the data or instructions in system memory 26. As discussed further below, CPU 20 references data and instructions by effective addresses. Thus, in order for CPU 20 to access data and instructions within caches 42, 44 and 46, data memory management unit (DMMU) 48 and instruction memory management unit (IMMU) 50 translate the effective addresses of data and instructions, respectively, into virtual addresses and then into physical addresses that are supplied to caches 42, 44 and 46.

L1 instruction cache 46 and IMMU 50 are further coupled to instruction sequencing unit 52, which fetches instructions for execution from L1 instruction cache 46 utilizing addresses translated by IMMU 50. Instruction sequencing unit 52 processes branch instructions internally and temporarily buffers sequential (non-branch) instructions until execution resources for the sequential instructions are available. In the depicted illustrative embodiment, the sequential execution resources of processor 10, include integer unit(s) (IUs) 62, load-store unit (LSU) 68, and floating-point unit (FPU) 74. Each of execution units 62, 68, and 74 typically executes one or more instructions of a particular type of sequential instructions during each processor cycle by reference to operands stored within general purpose registers (GPRs) 66 and floating-point registers (FPRs) 72.

If any of execution units 62, 68, and 74 finishes executing an instruction, that execution unit notifies completion unit 76. Completion unit 76 then directs the completion of the instruction and, if necessary, the commitment of the data results to the state of CPU 20.

Virtual Address Space

To illustrate the present invention, an embodiment will be described in which instruction sequencing unit 52 and LSU 68 of each CPU 20 in NUMA data processing system 10 reference instructions and data utilizing 32-bit effective addresses, meaning that CPUs 20 have a 4 Gbyte ($2^{32}$) effective address space. This effective address space is a subset of a much larger virtual address space referenced by 52-bit virtual addresses. This virtual address space, which is shared by all CPUs 20 in NUMA data processing system 10, is partitioned into a number of (e.g., 4 Kbyte) memory pages, which each have an Page Table Entry (PTE) address descriptor that associates the base virtual address of the memory page with the corresponding physical address of the memory page in one of system memories 26.

Each of the multiple nodes 12 including a system memory 26 has one or more page tables residing in its system memories 26. The PTEs contained in each page table are organized by the operating system of NUMA data processing system 10 utilizing one of two hashing functions. In accordance with the present invention, the processing units 14 in a particular processing node 12 preferably access and cache only PTEs in the page tables within local system memory 26 and do not access page tables in other nodes 12.

Page Table

Figure 3:
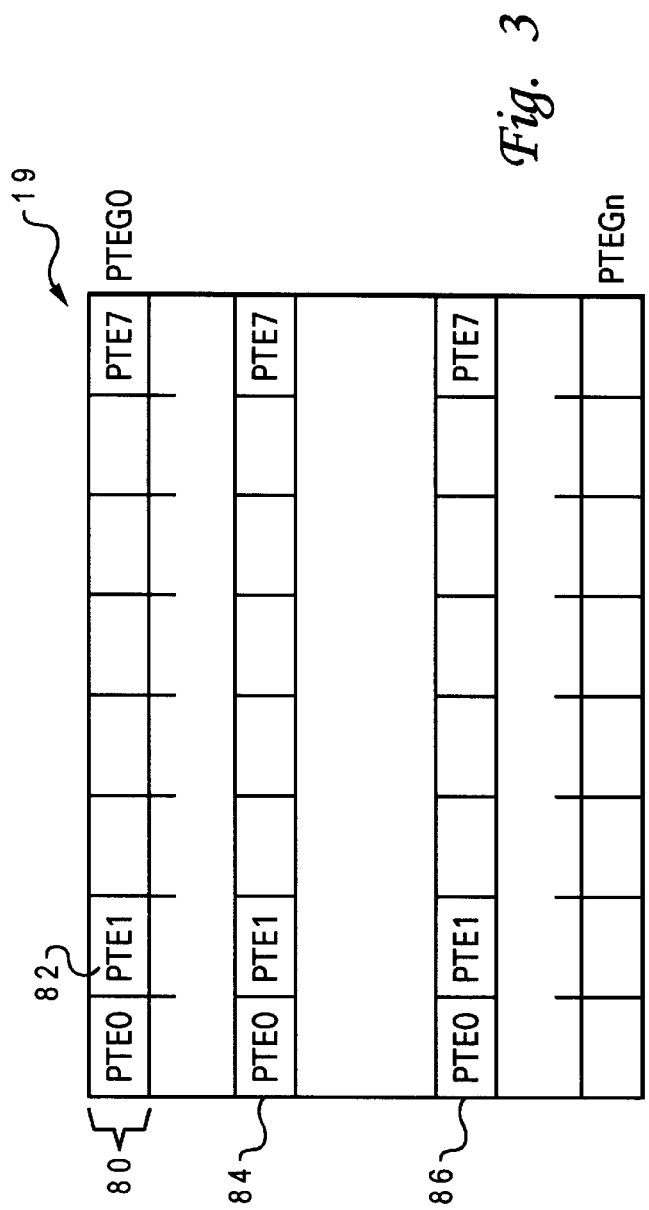
FIG. 3 depicts an illustrative embodiment of a page table in the NUMA data processing system illustrated in FIG. 1.

Referring now to FIG. 3, there is depicted a more detailed block diagram representation of an exemplary embodiment of a page table 19 in a system memory 26 of NUMA computer system 10 of FIG. 1. Page table 19 is a variable-sized data structure comprised of a number of Page Table Entry Groups (PTEGs) 80, which can each contain a number of PTEs 82. Each PTE 82 can be assigned to any location in either of a primary PTEG 84 or a secondary PTEG 86 in page table 19 depending upon whether a primary hashing function or a secondary hashing function is utilized by operating system 21 to set up the associated memory page in memory when paged in from non-volatile storage. The addresses of primary PTEG 84 and secondary PTEG 86 serve as entry points for page table search operations by tablewalk controller 78 of FIG. 2.

Page Table Entry (PTE)

Figure 4:
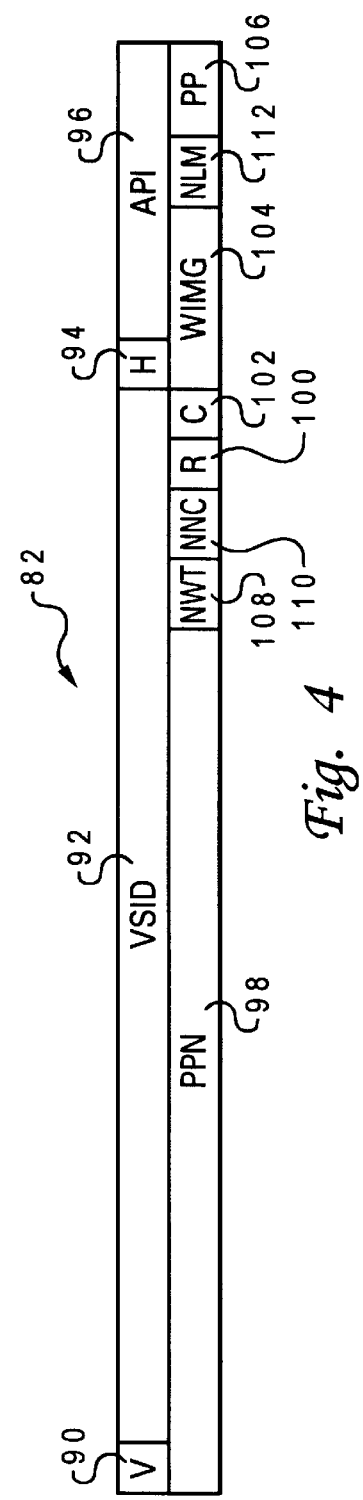
FIG. 4 illustrates an exemplary embodiment of a PTE in the NUMA data processing system illustrated in FIG. 1.

With reference now to FIG. 4, there is illustrated a pictorial representation of the structure of each PTE 82 within a page table 19. As illustrated, each PTE 82 includes a valid bit 90 indicating whether the PTE entry 82 is valid, a Virtual Segment ID (VSID) 92 specifying the high-order bits of a virtual page number, a hash function identifier (H) 94 indicating which of the primary and secondary hash functions was utilized to create the PTE 82, and an Abbreviated Page Index (API) 96 specifying the low order bits of the virtual page number. Hash function identifier 94 and the virtual page number specified by VSID 92 and API 96 are used to locate a particular PTE 82 during a search of page table 19 or Translation Lookaside Buffers (TLBs) 49 and 51 maintained by DMMU 48 and IMMU 50.

Still referring to FIG. 4, each PTE 82 further include a Physical Page Number (PPN) 98 identifying the corresponding physical memory page frame, referenced (R) bit 100 and changed (C) bit 102 indicating whether the memory page has been accessed or modified since these bits have been reset, memory access attribute (WIMG) bits 104 specifying memory update modes for the memory page, and page protection (PP) bits 106 defining access protection constraints for the memory page. Finally, each PTE 82 includes three new node-specific fields introduced by the present invention: Node Write Through (NWT) field 108, Node No-Intent-to-Cache (NNC) field 110, and Node Local Read-with-Intent-to-Modify (NLM) field 112.

In a preferred embodiment, NWT field 108 contains one bit for each node 12 in NUMA computer system 10, which each control whether processing units 14 in the associated node 12 will operate in a write-through mode for data belonging to the memory page associated with the PTE 82 if the data are resident in the system memory address space 28 of the system memory 26 in another node 12. For example, if a CPU in node 1 issues a store to a location in a memory page that is marked write-through for node 1, then upon finding the bit for node 1 set in the PTE 8, the CPU 20 sends the store data to its associated cache and memory hierarchy in conjunction with a NWT indicator that instructs the cache hierarchy 22 not to hold the modified data if the home node for the modified data is a node 12 other than node 1. Upon receiving the NWT indicator and store data, the cache hierarchy 22 associated with the CPU 20 will determine by reference to memory configuration registers set by the operating system whether the local node is the home node for the store data. If so, the cache hierarchy handles the store data according to the prior art access control (WIMG) bits 104, which typically means that cache hierarchy 22 caches the store data. In this manner, cache hierarchy 22 can subsequently supply the store data to other requesters by modified intervention.

However, if the home node for the store data is not the local node, cache hierarchy 22 issues a Write transaction on its local interconnect 18 to writeback the modified data to a system memory 26 in the home node 12. Because the modified data are immediately written back to the home node 12 in this case, the memory controller 24 at the home node 12 does not have to demand the writeback of the modified data back from a remote node 12 through separate coherency communication, thus improving the access latency of subsequent Read requests by consumers. Accordingly, the operating system of NUMA computer system 10 typically sets the NWT bit for each node 12 containing producers and does not set the NWT bit(s) for node(s) 12 containing consumers.

As an aside, it should be noted that NWT field 108 does not replace the prior art write-through (W) bit belonging to access control (WIMG) bits 104 so that backward compatibility is maintained. Instead, if the W bit is set, NWT field 108 is ignored.

Like NWT field 108, NNC field 110 preferably contains one bit for each node 12 in NUMA computer system 10. Each bit within NNC field 110 function as a Read-With-No-Intent-To-Cache (RWNITC) flag for its associated node 12. For example, if a CPU 20 in node 2 issues a load to a location in a memory page having the NNC bit set for node 2, then the CPU 20 sends a Read request to its associated cache and memory hierarchy together with a NNC indicator that instructs its cache hierarchy 22 not to cache the requested data. Assuming that the Read request misses in cache hierarchy 22, cache hierarchy 22 responds to the Read request and NNC indicator by issuing a RWNITC request (e.g., a Read request having a NNC flag set) on its local interconnect 18 instead of a conventional Read request. As will be appreciated, the RWNITC request may be transmitted by the local node controller 16 to another node 12 for servicing.

Importantly, the NNC flag in the RWNITC request informs coherency management logic within cache hierarchies 22 and memory controllers 24 receiving the request that the requested data will not be held within the requesting cache hierarchy 22 after satisfying the CPU's load request. Consequently, the coherency state of copies of the requested data residing in other cache hierarchies 22 need not be updated in response to the RWNITC request, and if the request is serviced by the home node 12 of the requested data, no update to the LMD 32 of the home node 12 is required. In addition, when a processing unit 14 subsequently requests exclusive access to the same data (e.g., by issuing a Read-with-Intent-to-Modify request), the memory controller 24 of the system memory 26 at the home node 12 in which the data reside does not have to invalidate any copy of the data at node 2, thus reducing inter-node coherency traffic and increasing performance. As will be appreciated from the foregoing, the operating system of NUMA computer system 10 preferably sets the NNC bit for each node 12 including consumers and does not set the NNC bit for nodes 12 containing producers.

Still referring to FIG. 4, the NLM field 112 within each PTE 82 preferably contains one bit associated with each node 12 in NUMA computer system 10. Each NLM bit serves as a global/local indicator of whether hardware in the associated node 12 must maintain global coherency through NUMA computer system 10 for addresses within the corresponding memory page or only local coherency within the single node 12 (i.e., whether software will assist the coherency hardware by performing global coherency management).

For example, if a CPU 20 in node 1 issues a store to a location in a memory page that is marked within NLM field 112 as "local" for node 1, then the CPU 20 sends an NLM local indicator with the store data to its associated cache hierarchy 22. The NLM local indicator instructs the cache hierarchy 22 to append the NLM local indicator to the RWITM request that is issued by the cache hierarchy 22 to access the target cache line. Upon receiving the RWITM request containing the NLM local indicator, the appropriate memory controller 24 in the home node 12 sources the requested cache line, but ignores the RWITM request from a coherency standpoint because the setting of the indicator to "local" indicates that it is the responsibility of software to handle the global coherency of the target memory page. Thus, the memory controller 24 will not update LMD 32. Hardware will, however, continue to manage coherency within the requesting node 12.

Typically, a bit within NLM 112 is set to the "local" state in operating scenarios in which execution of an application is restricted to the associated node 12. Because the inter-node communication latency of NUMA computer system 10 for data and coherency transfers can be quite large (e.g., 2000 CPU cycles or more), performance benefits can be obtained by permitting software to assist in coherency management in such operating scenarios since the software has access to additional information about the addresses for which high latency global coherency operations may be omitted without losing coherency. Although it is preferable if only one NLM bit is set to the "local" state at a time, in some embodiments of the present invention multiple NLM bits can be set to the "local" state concurrently, but such embodiments would introduce significant additional complexity in the software, thus lessening the performance benefit.

Address Translation

Figure 5:
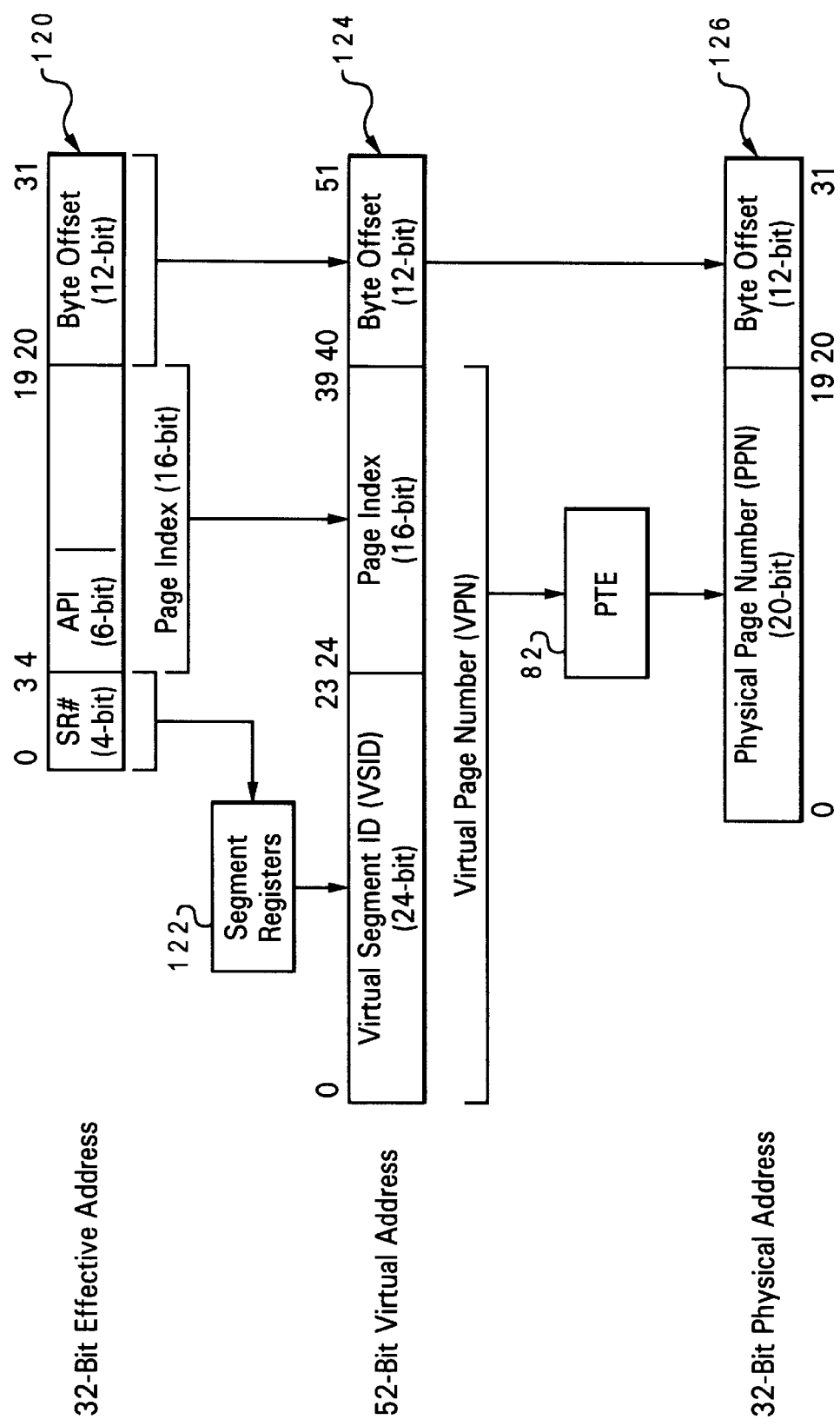
FIG. 5 is a high level flow diagram of the translation of an effective address to a virtual address and then to a physical address in accordance with the present invention.

With reference now to FIG. 5, there is illustrated a high level flow diagram of the address translation process utilized by each CPU 20 to translate effective addresses (EAs) utilized by CPUs into virtual addresses and then into physical addresses utilized to access cache hierarchies 22, system memory 26, and memory mapped I/O devices. As depicted in FIG. 2, LSU 68 transmits the 32-bit EA of each data access request to DMMU 48. Similarly, instruction sequencing unit 52 transmits the 32-bit EA of each instruction fetch request to IMMU 50. DMMU 48 and IMMU 50 each translate such EAs utilizing the process depicted in FIG. 5. As will be appreciated by those skilled in the art, similar address translation processes may be employed to translate 64-bit or 128-bit addresses.

As indicated, bits 0–3 of a 32-bit EA 120 to be translated are utilized to select one of the 16 segment registers 112 within either DMMU 48 (for data) or IMMU 50 (for instructions). (A 64-bit EA implementation would preferably utilize a different segmentation mechanism than shown, with the remainder of the address translation differing only in the size of the various fields.) The 24-bit VSID stored in the selected one of segment registers 122, which together with the 16-bit page index and 12-bit byte offset of EA 120 form a 52-bit virtual address 124, is passed to the appropriate one of DTLB 49 or ITLB 51, which in an illustrative embodiment are each implemented as a two–way set associative PTE cache. Bits 15–19 of EA 120 then select two PTEs stored within a particular line of the TLB. Bits 10–14 of EA 120 are compared to the address tags associated with each of the selected PTEs and the VSID field and API field (bits 4–9 of the EA) are compared with corresponding fields in the selected PTEs. In addition, the valid (V) bit of each selected PTE is checked. If the comparisons indicate that a match is found, the PP bits of the matching PTE 82 are checked for an exception, and if these bits do not cause an exception, the 20-bit PPN (Physical Page Number) contained in matching PTE 82 is passed to the appropriate one of L1 data cache 44 and L1 instruction cache 46 (together with an NWT, NNC or NLM indication, if appropriate) to determine if the requested data or instructions are resident. As shown in FIG. 5, concatenating the 20-bit PPN with the 12-bit byte offset specified by EA 120 produces a 32-bit physical address 126 of the requested data or instructions in system memory 26.

Although the PTE 82 required to translate a virtual address 124 into a physical address 126 is usually resident in one of DTLB 49 and ITLB 51 due to locality of reference, performing an address translation may require tablewalk controller 78 to locate the required PTE 82 in a cache hierarchy 22 or a system memory 26 using known methods.

As has been described, the present invention provides a NUMA data processing system having a page table including PTEs that contains node-specific storage and coherency control information. By incorporating the node-specific control information within the PTEs, the data storage and coherency management activities performed by the system hardware can be easily adapted to the behavior of the executing software to eliminate unnecessary coherency communication and reduce data access latency. As a result, overall system performance is improved.

While the invention has been particularly shown and described with reference to a preferred embodiment, it will be understood by those skilled in the art that various changes in form and detail may be made therein without departing from the spirit and scope of the invention. For example, although the present invention has heretofore been described with respect to fixed-size virtual memory pages having associated PTEs, it should be understood that the present invention is also applicable to the variable-sized blocks of virtual memory, which have associated block address table (BAT) entries. In addition, while the invention has been described with respect to particular node-specific control information incorporated within the page table, those skilled in the art will appreciate that the present invention is not limited in scope to the particular control information disclosed herein, but is generally applicable to the inclusion of node-specific control information within the page table.

What is claimed is:

1. A non-uniform memory access (NUMA) data processing system, comprising:
   a plurality of nodes coupled to a node interconnect, said plurality of nodes containing a plurality of processing units and at least one system memory; and
   a table resident in said at least one system memory, said table including a plurality of entries for translating a group of non-physical addresses to physical addresses, wherein said entry individually specifies control information pertaining to a respective group of non-physical addresses for each of said plurality of nodes, wherein:
      each entry includes a plurality of bit fields each associated with a respective one of said plurality of nodes and translation information for a respective group of non-physical addresses;
      each of said plurality of bit fields individually specifies, for an associated one of said plurality of nodes, control information pertaining to said respective grgup of non-physical addresses;
      said control information specified in at least two of said plurality of bit fields in a same entry among said plurality of entries differs; and
      each of said plurality of processing units accesses data in accordance with control information for its node by referencing a copy of said control infonnation during address translation.

2. The non-uniform memory access (NUMA) data processing system of claim 1, wherein said table comprises a page table and said plurality of entries comprises a plurality of page table entries.

3. The non-uniform memory access (NUMA) data processing system of claim 1, wherein said control information comprises at least one data storage control field.

4. The non-uniform memory access (NUMA) data processing system of claim 3, wherein said data storage control field comprises a plurality of write trough indicators that are each associated with a respective one of said plurality of nodes, wherein a set write through indicator instructs the at least one processing unit in the associated node to write modified data associated with any non-physical address within the group to system memory in a home node among said plurality of nodes.

5. The non-uniform memory access (NUMA) data processing system of claim 3, wherein said data storage control field comprises a plurality of non-cacheable indicators that are each associated with a respective one of said plurality of nodes, wherein a set non-cacheable indicator instructs the at least one processing unit in the associated node to not cache data associated with non-physical addresses within the group.

6. The non-uniform memory access (NUMA) data processing system of claim 1, wherein said control information comprises coherency control information.

7. The non-uniform memory access (MUMA) data processing system of claim 6, wherein said coherency control information comprises a plurality of coherency indicators that are each associated with a respective one of said plurality of nodes, wherein a set coherency indicator indicates that inter-node coherency for data associated with the entry will be maintained with software support.

8. A method of operating a non-uniform memory access (NUMA) data processing system including a plurality of nodes coupled to a node interconnect, said plurality of nodes containing a plurality of processing units and at least one system memory, said method comprising:
   creating a table resident in at least one system memory, said table including a plurality of entries, wherein each entry includes a plurality of bit fields each associated with a respective one of said plurality of nodes and translation information for a respective group of non-physical addresses, wherein each of said plurality of bit fields individually specifies, for an associated one of said plurality of nodes, control information pertaining to said respective group of non-physical addresses, and wherein said control information specified in at least two of said plurality of bit fields in a same entry among said plurality of entries differs; and
   accessing said entry to translate a non-physical address to a physical address.

9. The method of claim 8, wherein said control information comprises at least one data storage control field, said method further comprising:
   handling storage of data associated with said non-physical address in accordance with said data storage control field.

10. The method of claim 9, wherein said data storage control field comprises a plurality of write through indicators that are each associated with a respective one of said plurality of nodes, said handling step comprising:
   in response to a write trough indicator being set for a particular node among said plurality of nodes, a processing unit in the particular node writing back modified data to system memory in a home node among said plurality of nodes independently of any coherency communication from the home node.

11. The method of claim 9, wherein said data storage control field comprises a plurality of non-cacheable indicators that are each associated with a respective one of said plurality of nodes, wherein said handling step comprises:
   in response to a non-cacheable indicator being set for a particular node among said plurality of nodes, a processing unit in the particular node issuing a request for data associated with the non-physical address in conjunction with an indication that the processing unit will not cache the requested data.

12. The method of claim 8, wherein said control information comprises coherency control information.

13. A method of operating a non-uniform memory access (NUMA) data processing system including a plurality of nodes coupled to a node interconnect, said plurality of nodes containing a plurality of processing units and at least one system memory, said method comprising:
   creating a table resident in at least one system memory, said table including at least one entry for translating a group of non-physical addresses to physical addresses, wherein said entry individually specifies coherency control information pertaining to said group of non-physical addresses for each of said plurality of nodes, wherein said coherency control information comprises a plurality of coherency indicators that are each associated with a respective one of said plurality of nodes;
   accessing said entry to translate a non-physical address to a physical address; and
   in response to a coherency indicator being set for a particular node among said plurality of nodes, a processing unit in the particular node issuing a request for data associated with the non-physical address in conjunction with an indication that hardware need not maintain global coherency for the requested data.

14. A non-uniform memory access (NUMA) data processing system, comprising:
   a plurality of nodes coupled to a node interconnect, said plurality of nodes containing a plurality of processing units and at least one system memory; and
   a table resident in said at least one system memory, said table including at least one entry for translating a group of non-physical addresses to physical addresses, wherein said entry individually specifies control information pertaining to said group of non-physical addresses for each of said plurality of nodes, wherein said coherency control information includes a plurality of coherency indicators that are each associated with a respective one of said plurality of nodes, and wherein a coherency indicator set to a local state indicates that inter-node coherency need not be maintained for data associated with the entry;
   wherein a processing unit among said plurality of processing units, responsive to obtaining translation of a non-physical address by reference to an entry in which coherency indicator for the node containing the processing unit is set to the local state, issues a request for data associated with the non-physical address in conjunction with an indication that hardware need not maintain global coherency for the requested data.

* * * * *

UNITED STATES PATENT AND TRADEMARK OFFICE
CERTIFICATE OF CORRECTION

PATENT NO. : 6,658,538 B2
DATED : December 2, 2003
INVENTOR(S) : Arimilli et al.

It is certified that error appears in the above-identified patent and that said Letters Patent is hereby corrected as shown below:

Column 12,
Line 47, please delete "grgup" and replace it with -- group --;
Line 53, please delete "infonnation" and replace it with -- information --.

Signed and Sealed this

Fourth Day of January, 2005

JON W. DUDAS
*Director of the United States Patent and Trademark Office*